INVENTORS:
THOMAS H. LEE
TSENG W. LIAO
BY William Friedman
ATTORNEY

Nov. 22, 1966    T. H. LEE ETAL    3,287,588
SPARK GAP TYPE OF SURGE ARRESTOR FOR A D.-C. SYSTEM
Filed Sept. 17, 1964    2 Sheets-Sheet 2

INVENTORS:
THOMAS H. LEE
TSENG W. LIAO
BY William Freedman
ATTORNEY

United States Patent Office 3,287,588
Patented Nov. 22, 1966

3,287,588
SPARK GAP TYPE OF SURGE ARRESTOR FOR A D.-C. SYSTEM
Thomas H. Lee and Tseng W. Liao, Media, Pa., assignors to General Electric Company, a corporation of New York
Filed Sept. 17, 1964, Ser. No. 397,215
10 Claims. (Cl. 313—154)

This invention relates to a spark gap type of surge arrestor for protecting a D.-C. power system against the effects of voltage surges and, more particularly, relates to a surge arrestor of this type which is capable of protecting the D.-C. system against the effects of both lightning surges and switching surges.

The usual spark gap type of surge arrestor comprises a gap that is caused to spark-over in response to a voltage surge of a predetermined amplitude appearing on the protected power circuit. After the spark-over occurs, an arc is established across the gap, and current flows through the arc to dissipate the energy of the surge from the power circuit. Power current from the power circuit also flows through the arc following spark-over. The surge arrestor must be capable of interrupting this power circuit when the energy of the surge has been dissipated so as to restore the circuit to its normal condition, i.e., the condition in which no current is passing through the arrestor.

In a surge arrestor for an A.-C. circuit, interruption of the power current that follows spark-over is greatly facilitated by the fact that the power current ultimately passes through a natural current zero. All that is required to interrupt this alternating current is to develop dielectric strength across the gap at a higher rate that the rate of rise of the recovery voltage following the natural current zero. But with a surge arrestor for a D.-C. circuit, the power current following spark-over has no natural current zero, and interruption can be effected only by forcing the current to zero and then building up dielectric strength at the required rate.

In our application S.N. 298,942, filed July 31, 1963, we disclose and claim a spark gap type of surge arrestor that has the ability to interrupt high values of D.-C. power current following spark-over. This surge arrestor builds up a relatively high impedance following spark-over that forces the D.-C. current to zero. This surge arrestor, while highly satisfactory for protecting against the surges resulting from switching (i.e., switching surges), is not entirely satisfactory for protecting against lightning surges. This is the case because typical lightning discharge currents, though very short in duration, are much higher than the maximum currents accompanying the most severe switching surges. If such a high lightning discharge current passed through the arrestor of the aforesaid application, it would develop an excessive voltage thereacross.

To facilitate an understanding of the problem of handling lightning surges, it may be desirable to briefly consider the nature of the current that flows through an arrestor when the protected circuit is struck by lightning at a point near the arrestor. This current is typically thought of as comprising two parts: (1) a lightning discharge current, which is the current of the lightning stroke itself, and (2) a follow current, which is the current of the system that flows through the arrestor following the passage of the lightning discharge current. The magnitude of the lightning discharge current is largely independent of the impedance of the arrestor and therefore may reach very high values even if the arrestor impedance is high. The voltage that will be developed across the arrestor by the lightning discharge current varies directly with the impedance of the arrestor, and since this voltage also appears across the protected equipment, it is most important that the arrestor have a low impedance during the flow of lightning discharge current. This requirement for low impedance during lightning discharge currents conflicts, to some extent, with a second requirement, which is that the arrestor develop a relatively high impedance during the flow of D.-C. follow current in order to drive this latter current to zero. This relatively high impedance is also needed to drive to zero the D.-C. follow current accompanying a switching surge.

Accordingly, an object of our invention is to provide for a D.-C. system a surge arrestor capable of developing during follow currents a relatively high impedance for forcing the follow current to zero but capable of limiting its impedance during lightning discharge currents to a relatively low value that does not result in excessive voltages thereacross.

Another object is to provide a surge arrestor capable of performing as in the immediately preceding paragraph and also capable of protecting against switching surges.

Still another object is to provide a low impedance path through the interrupter for arcs carrying lightning discharge current and a separate higher impedance path through the arrestor for arcs carrying follow current or carrying switching surge current.

In carrying out our invention in one form, we provide for a D.-C. circuit, a surge arrestor that comprises a pair of spaced-apart electrodes defining a gap therebetween. Each of the electrodes comprises an arc-initiation portion and first and second arc-running portions respectively located at opposite sides of the arc-initiation portion. Means is provided for causing an arc to be established between said arc-initiation portions in response to a voltage surge of a predetermined magnitude appearing on said D.-C. circuit. First magnetic means is provided for propelling an arc established between said arc-initiation portions as a result of a lightning surge along said second arc-running portions during passage of lightning discharge current. Second magnetic means is provided for propelling an arc carrying power follow current after passage of said lightning discharge current along said first arc-running portions in a direction away from said arc-initiation portions. Means is also provided for developing, as said power follow current arc moves along said first arc-running portions, an increasing arc voltage that forces the power follow current toward zero.

The arrestor is so constructed that it presents a relatively low impedance to current flowing through arcs on said second arc-running portions and a substantially higher impedance to current flowing through arcs on said first arc-running portions. This impedance is dependent upon the spacing of insulating sidewalls disposed at opposite sides of the electrodes and extending across said gas generally parallel to arcs between the electrodes. The effective spacing of these sidewalls is made relatively large in the region of the gap between said second arc-running portions and relatively small in the region of the gap between said first arc-running portions.

For a better understanding of our invention, reference may be had to the following description taken in connection with the accompanying drawing, wherein:

FIG. 2 is taken along the line 2—2 of FIG. 3.

Figures 1, 4:
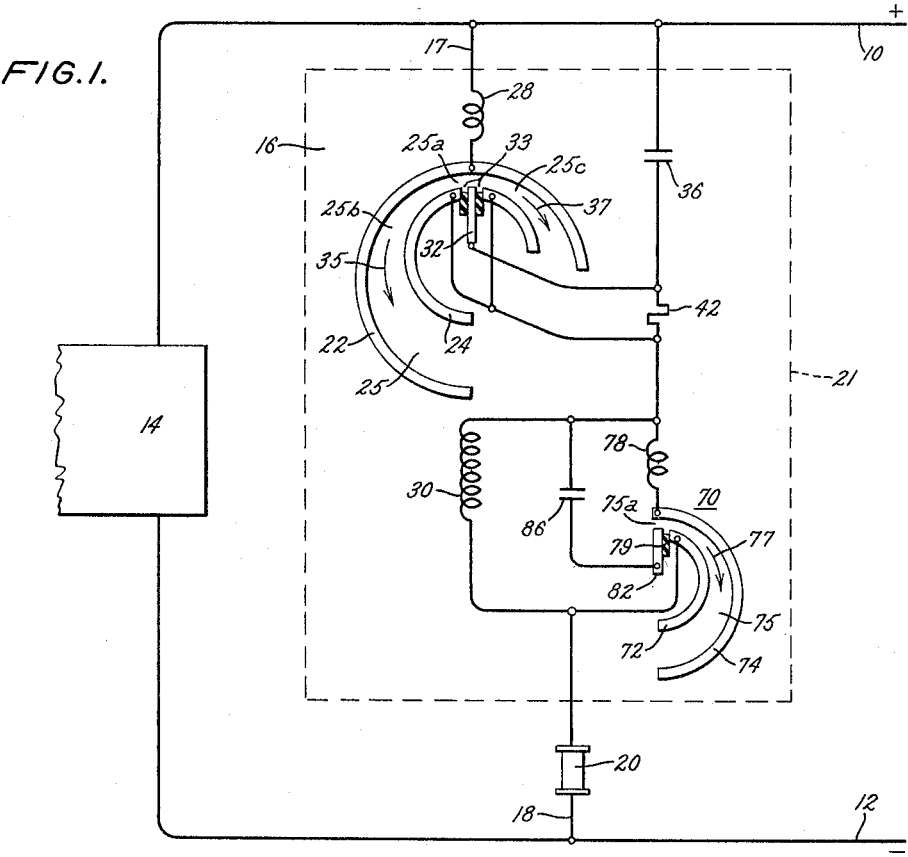
FIG. 1 is a schematic view of a surge arrestor embodying one form of our invention connected to protect a D.-C. power circuit.
FIG. 4 is a cross-sectional view along the line 4—4 of FIG. 3.

Referring now to FIG. 1, there is shown a D.-C. circuit comprising a positive bus 10, a negative bus 12, and semiconductor rectifier equipment 14 connected to the buses for supplying D.-C. power thereto. As stated hereinabove, voltage surges, produced either by switching or by lightning, may appear on buses 10, 12 and these surges could damage the semiconductor equipment 14 unless suitable protection is provided.

For protecting the equipment 14 from such voltage surges, a surge arrestor, schematically shown at 16 is provided. This surge arrestor 16 has one terminal 17 connected to the positive bus 10 and its opposite terminal 18 connected to the negative bus 12, preferably through a resistor 20. The resistor 20 is a non-linear resistor, preferably made of a material having a negative resistance-current characteristic, such as the material sold by General Electric Co. under the trademark Thyrite.

Figure 2:
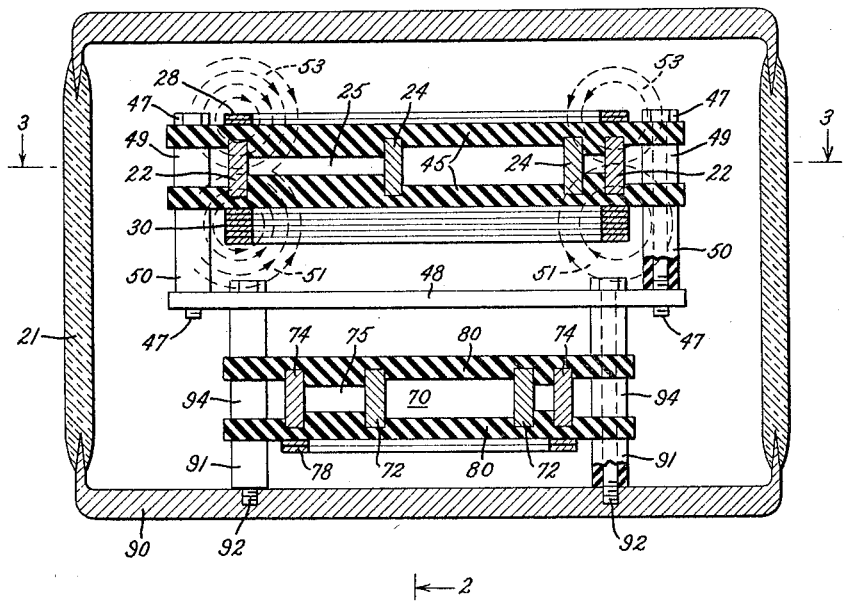
FIG. 2 is a cross-sectional view through an arrestor of the type schematically depicted in FIG. 1.
Figure 3:
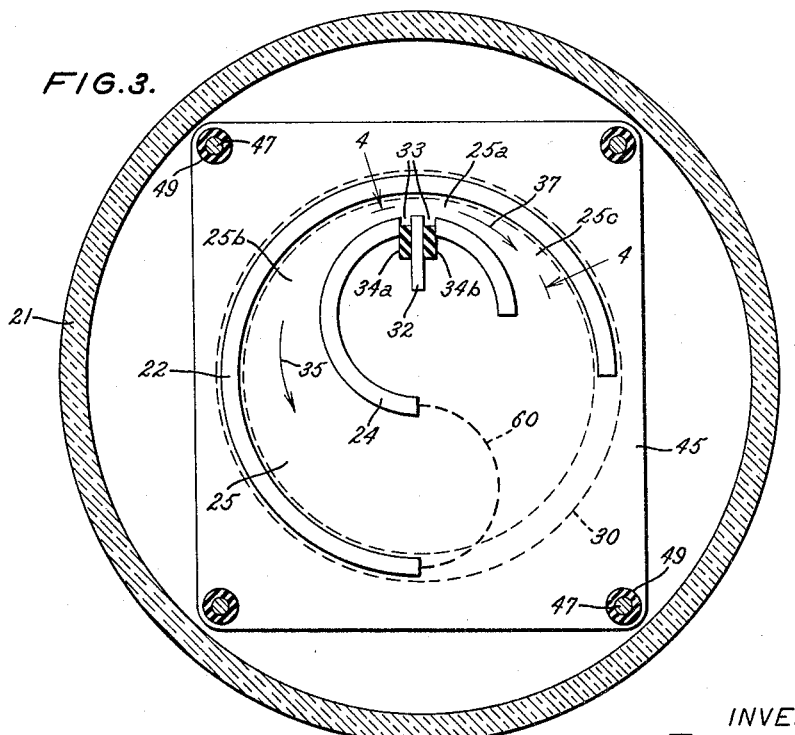
FIG. 3 is a cross-sectional view along the line 3—3 of FIG. 2.

The arrestor 16, which is shown in greater detail in FIGS. 2 and 3, comprises a sealed envelope 21 containing an arc-extinguishing gas, preferably consisting essentially of hydrogen. Disposed within the envelope 21 is a pair of spaced-apart main electrodes 22 and 24 defining a gap 25 therebetween across which arcs are adapted to be established. A preferred material for the electrodes is a copper tungsten mixture, such as that sold under the trade name Elkonite. Stainless steel is also suitable. Each electrode is formed from a strip of such material extending along a generally circular path over approximately three-fourths of the periphery of the circle. One electrode 22 is disposed about the other electrode 24 and the centers of curvature of the two electrodes are offset with respect to each other so that the gap 25 is relatively short in length in a region 25a intermediate the ends of the two electrodes and generally increases in length as either of the ends of the electrodes is approached via a circumferential path extending along the length of the electrodes away from the region 25a. The region 25a of reduced electrode spacing is referred to hereinafter as the arc-initiation region, and the portions of the gap 25 on the respective opposite sides of the arc-initiation region 25a are referred to as arc-running regions 25b and 25c. The portions of the electrodes in the arc-initiation region 25a are referred to as arc-initiating portions, and the portions of the electrodes in the arc-running regions 25b and 25c are referred to as arc-running portions.

Connected in series with the electrodes 22 and 24 are two arc-propelling coils 28 and 30, one coil 28 between the terminal 17 and electrode 22 and the other coil 30 between the terminal 18 and the electrode 24. These coils 28 and 30 are used to create magnetic fields for propelling the arc established between the main electrodes, as will soon be explained in greater detail.

For initiating an arc between the main electrodes 22 and 24, a trigger electrode 32 is provided in the arc-initiation region of the main electrode 24. The trigger electrode 32 is insulated from the main electrode 24 and is separated at its respective sides from the main electrode 24 by strips 34a and 34b of high dielectric constant insulating material, preferably barium titanate. When a surge voltage of a predetermined minimum amplitude is applied between the trigger electrode 32 and main electrode 24, the electric field near the edge of the insulating material is intensified due to the high dielectric constant of the insulating material and a spark will jump across the gap 33 between the trigger electrode and the main electrode 24. The positive ions produced by the spark distort the electric field between the two main electrodes 22 and 24, reducing the breakdown voltage between the main electrodes 22 and 24 to a value below the applied voltage between the main electrodes. This results in an arc between the two main electrodes 22 and 24 in their arc-initiation regions.

If the arc has been initiated by a switching surge, the current that flows through the arc will flow through both of the coils 28 and 30 from the positive bus 10 to the negative bus 12. The lower arc-propelling coil 30 is wound in such a direction that the current flowing through it in this direction creates a magnetic field that acts to drive the arc in the direction of arrow 35 of FIG. 1, as will soon appear more clearly. The other arc-propelling coil 28 is wound in an opposite direction so that the magnetic field created by current flowing through it from positive bus 10 to negative bus 12 tends to drive the arc in a direction 37 opposite to the direction 35. But the coil 30 has a much higher number of turns than the coil 28 (e.g., 100 as compared to 2), and thus coil 30 is capable of creating a much more intense magnetic field than the coil 28. As a result, so long as the two coils are energized by the same current, the magnetic field from the coil 30 predominates over that from the coil 28 to drive the arc in the direction of arrow 35. As will soon be explained in greater detail, the coil 30 is shorted out and thus rendered ineffective when lightning discharge currents flow through the arrestor. As a result, when lightning discharge currents flow, the other coil 28 can drive the arc in the direction of arrow 37.

The normal voltage of the circuit 10, 12, which is the voltage normally appearing between the main electrodes 22 and 24, is of insufficient magnitude to break down or flash-over the main gap 25. In the absence of the trigger electrode 32, even voltage surges having a peak of several times normal voltage are insufficient to flash-over the main gap 25. But with the trigger electrode 32 present and connected to be energized by the same potential as applied to the main electrode 22, the voltage on bus 10 at which the main gap will flash-over is reduced to a much lower value, as will soon appear more clearly.

For applying surge voltages to the trigger electrode 32 when they appear across the buses 10, 12 the trigger electrode 32 is connected to the bus 10 through a capacitor 36. Under normal or steady state conditions, the trigger electrode 32 will be essentially isolated from the bus 10 by the capacitor 36. But when surge voltage appears on the bus 10, the capacitor presents no significant impedance, and essentially the entire surge voltage will appear across the trigger gap 33 between the trigger electrode 32 and the main electrode 24. The trigger gap 33 has a spark-over voltage that is set at such a value that it will spark-over before the surge voltage reaches a damaging magnitude. This spark-over voltage is typically set at about 200% of the normal voltage between the buses 10 and 12.

It will be noted that a resistor 42, which has a very low resistance in comparison to the leakage resistance of capacitor 36, is connected between the trigger electrode 32 and the main electrode 24. The purpose of this resistor 42 is to maintain the trigger electrode 32 and the main electrode 24 at substantially the same potential under normal or steady state conditions, i.e., conditions when no surge voltage is present between the buses 10 and 12. Under these conditions, there is a high resistance current path present across the buses 10, 12 that comprises the series combination of the leakage resistance of capacitor 36, the parallel combination of resistor 42 and the leakage resistance of the trigger gap 33, and the resistance of elements 30 and 20. The resistance of elements 42, 30 and 20 is very low in comparison to the leakage resistance of the capacitor 36. Hence, almost all the steady state voltage appears across the capacitor 36, and substantially none of this voltage appears across the resistor 42 and, hence, across the trigger gap 33 in parallel with the resistor 42. Isolating the trigger gap from the steady state voltage is desirable in preventing degradation of the trigger gap and possible false spark-overs.

Referring to FIG. 2, it will be noted that the main electrodes 22 and 24 are mounted between two insulating plates 45 that act as sidewalls for the arcing gap 25 between the electrodes. These plates 45 are substantially imperforate in the region of the arcing gap 25 and extend generally parallel to the longitudinal axis of any arc between the electrodes 22 and 24. These insulating plates 45 are made of a material that emits very little gas when exposed to an arc, for example, aluminum silicate. The plates 45 are clamped against opposite edges of the electrodes 22 and 24 by suitable fastening means such as the insulating bolts 47 located at spaced-apart locations around the outer periphery of plate 45. These bolts 47 extend through aligned openings in the insulating plates 45 and are threaded into a stationary supporting member 48 at their lower ends. Surrounding each bolt 47 between the plates 45 is a spacer 49 of insulating material that limits the clamping pressure applied by the bolts 47. Also surrounding each bolt is a sleeve 50 that supports the insulating plates 45 relative to the stationary supporting plate 48.

The coils 28 and 30 for creating the arc-propelling magnetic field are mounted on the outer sides of the insulating plates 45. Each of these coils is preferably of a circular configuration as viewed in FIG. 3, and approximately three-fourths of the circumference of each coil is disposed approximately in alignment with the outer three-fourths circular electrode 22. As previously pointed out, the coils 28 and 30 are connected in circuit in such a manner that when current flows through the arrestor, it flows through the coils in opposite angular direction. The approximate shape and direction of the magnetic field surrounding the coil 30 is indicated by the dotted line arrows 51 of FIG. 2; whereas the approximate shape and direction of the magnetic field surrounding the coil 28 is illustrated by the dotted line arrows 53 of FIG. 2. Since the lower coil 30 has a much higher number of turns than the upper coil (for example 50 times as many), its magnetic field at 51 is not significantly affected by the presence of the magnetic field 53 from the upper coil 28. This magnetic field at 51 has a component that extends across the arcing gap 25 in a direction perpendicular to the longitudinal axis of any arc between the electrodes 22 and 24. As is known, a magnetic field applied transverse to an arc will coact with the local magnetic field around the arc to drive the arc in a direction transverse to the longitudinal axis of the arc and transverse to the direction of the applied magnetic field. The polarity of the magnetic field applied by coil 30 is selected so that the arc-propelling force developed by this coil 30 is in the direction of arrow 35 in FIGS. 1 and 3. Thus, when an arc is established at the arc-initiation region 25a, and the coil 30 is effectively in circuit therewith, the arc is driven along the electrodes 22 and 24 in the direction of arrow 35 into the arc-running region 25b of the gap 25.

The motion of the arc in the direction of arrow 35 of FIG. 3 progressively lengthens the arc due to the progressively increasing length of the arcing gap 25. This progressive lengthening of the arc produces a progressive increase in the arc voltage, which progressively reduces the arcing current. When the arc voltage exceeds the voltage applied by the system to the main gap, the arcing current will rapidly approach zero. If the energy of the voltage surge that initiated the arc has then been dissipated in the arrestor, the arc will be extinguished and no further breakdown of the gap 25 will occur, thus enabling the system to be restored to normal operation. It will be apparent that the highest arc voltage is developed when the arc reaches the end of the electrodes 22, 24 and is bowed outwardly in its central region, as is shown at 60 in FIG. 3. When in this position, the arc has its maximum length.

The arc voltage developed when the arc is in position 60 is also dependent upon the amount of surge energy remaining when the arc reaches this position. If the surge has been completely dissipated when the arc reaches its position 60, then the arc voltage developed will be lower than it was when the surge was still present, but this arc voltage will still exceed the normal circuit voltage and be sufficient to drive the arc current to zero.

It is important that the speed of arc motion be rather carefully controlled. If the arc is moved too slowly, then it vaporizes electrode material so profusely that the insulating plates 45 will quickly become coated with electrode vapor condensate, and the required dielectric strength between the electrodes 22 and 24 is impaired, particularly in the critical arc-initiation region 25a where the gap 25 is short. On the other hand, if the arc is moved too rapidly, then the arc voltage builds up so quickly that the arc-initiation region 25a of the gap 25 does not have an adequate opportunity to recover its dielectric strength sufficiently to withstand the arc voltage that would be developed even after the surge energy has been completely dissipated. This can result in the arc-initiation region 25a continuing to flash-over after the surge has disappeared and can also result in the arc-initiating region 25a repeatedly flashing over well ahead of the time that the arc reaches its position 60. This latter condition results in the arcing duty being concentrated in the arc-initiating region 25a, and this causes excessive electrode vaporization and resultant impairment of the insulating properties of the side plates 45 in the arc-initiating region. To avoid this concentration of arcing duty in the arc-initiating region 25a, the time required for the arc to reach its position 60 at the end of the electrodes 22 and 24 should be made long enough for the arc-initiating region 25a to have then recovered sufficient dielectric strength to withstand a voltage equal to the highest arc voltage that is developed when no surge energy remains. In an actual embodiment of our invention, we have been able to recover substantially all of the original dielectric strength in the arc-initiating region 25a by the time the arc reaches its position 60, which is usually even more dielectric strength than that required to withstand the highest arc voltage developed when no surge remains.

Two additional factors that have an important effect on whether the arc-initiation region 25a will have recovered its dielectric strength sufficiently to withstand the required arc voltage when the arc reaches position 60 are the length of the electrodes 22, 24 and their spacing. The electrode length affects the time required for the arc to reach its position 60 of maximum arc voltage; and the electrode spacing effects the amount of arc voltage built up and the dielectric strength at 25a.

The arc voltage that is developed depends not only upon the arc length but also upon a number of other factors. An important one of these other factors is the nature of the gas that is present in the gap. Hydrogen is an ideal gas for our arrester not only because of its ability to produce high arc voltages when the arc is located in the regions 24a and 25a but also because of its relatively low dielectric strength. Because of this low dielectric strength of hydrogen, the trigger gap can be made to spark over at a desired low voltage suitable for protecting the low voltage system 10, 12, 14. Yet despite this low spark-over voltage, adequate arc voltage can be developed with hydrogen to cause the arrester to control the arcing current in the desired manner described herein.

For the protection of low voltage power circuits, i.e., circuits having a normal voltage rating below about 1000 volts, a preferred pressure for the hydrogen is 10 to 20 inches of mercury.

Another factor, and probably the most important one, that controls the amount of arc voltage that can be developed is the spacing between the insulating side plates 45. If this spacing is greater than about $3/16$ inch, the arc will become diffused and the resulting arc voltage will be very low. On the other hand, if the spacing is below about $1/32$ inch, then the arc will be unable to move out of the arc-initiation region 25a into the arc running region of the gap 25. This results in excessive electrode heating and vaporization, as well as low arc voltage. Thus, in a preferred form of our invention, we space the sidewalls 45 by approximately .06 inch in the regions 25a and 25b. Preferably, also we maintain this spacing substantially constant in these regions 25a and 25b.

The operation of our arrestor will now be described for a low-energy voltage surge, assumed to be a switching surge, that has a peak voltage high enough to spark over the trigger gap and a total energy that can be dissipated by a single current pulse through the arrestor, e. g., less than 10 watt-seconds. This voltage surge will produce an arc between the main electrodes 22 and 24 in the arc-initiation region 25a due to the previously-described triggering action of the trigger electrode 32. The current that flows through the arc will energize the coils 28 and 30, thus creating a net magnetic field that drives the arc away from the arc-initiation region 25a and into the arc-running region 25b in the direction of arrow 35. This increases the arc voltage thereby reducing the arcing current. Ultimately the arc voltage reaches a higher value than the voltage applied by the system to the main gap 25, and this drives the arcing current rapidly toward zero, finally extinguishing the arc. By this time, the energy in the low-energy switching surge has been completely dissipated in the arrestor and the Thyrite element 20, and thus there is no surge energy remaining to reinitiate the arc, and the system is restored to normal. During the above-described surge dissipation, the Thyrite resistance element 20 helped to limit the current flowing through the gap device; but for many applications, the assistance of the Thyrite element is unnecessary, and the Thyrite element may therefore be dispensed with in such applications.

Assume now that the energy of the switching surge is much higher, for example, several hundred watt-seconds. The arc will be driven from the arc-initiation region 25a into the position 60 of FIG. 3 and will once again develop an arc voltage high enough to drive the current rapidly toward zero. But only a small portion of the surge energy will have been dissipated by this time, and the remaining surge energy will produce another abrupt voltage rise that will cause the main gap to sparkover in the arc-initiating region 25a, thus initiating another arc between the main electrodes in the arc-initiating region 25a. The first arc may or may not have been completely extinguished at the instant that the second arc is established, but upon establishment of the second arc, the first arc vanishes. The second arc, like its predecessor, is driven in the direction of arrow 35 into position 60 thereby increasing the arc voltage and driving the arc current rapidly toward zero. Just before or as soon as the current reaches zero, the surge voltage resulting from the remaining surge energy initiates a third arc in the arc-initiating region 25a. The second arc vanishes, and the third arc is handled in the same manner as its predecessor. This sequence of events is repeated over and over again until the energy of the switching surge is finally completely dissipated. When this complete dissipation occurs, the maximum arc voltage developed when the arc is at position 60 is insufficient to cause a breakdown at the arc-initiation region 25a, and hence the gap acts thereafter to prevent further current flow.

The portions 25a and 25b of the arrestor are substantially the same as similarly-designated portions of the arrestor disclosed and claimed in our aforesaid application S.N. 298,942. A more detailed explanation of the manner in which these portions of the arrestor operate to dissipate the energy of a switching surge is contained in that application, and reference may be had thereto if more such information is desired.

Although the left hand portion 25b of the surge arrestor can handle arcs carrying switching surge currents in a highly satisfactory manner, as was explained hereinabove, this portion of the surge arrestor is not entirely satisfactory for handling arcs carrying lightning discharge currents. As mentioned hereinabove, the current through an arrestor that accompanies a lightning surge comprises two parts: (1) a lightning discharge current, which is the current of the lightning surge itself, and (2) a follow current, which is the current of the system that flows through the arrestor following passage of the lightning discharge current. The magnitude of the lightning discharge current is largely independent of the impedance of the arrestor and therefore may reach very high values. If such an extreme high current arc were forced from the arc-initiating region 25a in the direction of arrow 35, as described hereinabove for a switching surge arc, an excessively high arc voltage would be developed. In this respect, the discharge path between the electrodes 22 and 24 at the left hand side of the arc-initiating region has a relatively high impedance. For switching surge arcs, this high impedance is desirable because it enables the arc voltage to be built up quickly to force the switching surge current toward zero. The flow of switching surge current through this relatively high impedance path does not develop excessive voltages across the arrestor because the switching surge current is relatively low and is limited by the relatively high impedance of the arrestor. But lightning discharge currents will be much higher and will have a magnitude that is essentially independent of the arrestor impedance. Accordingly, if this high lightning discharge current was discharged through the high impedance path at the left hand side 25b of the arrestor, excessive voltages would be developed across the arrestor that could damage the rectifier equipment 14.

To prevent the development of such excess voltages, we exclude high lightning discharge current arcs from the left hand region 25b of the arrestor and instead propel these arcs from the arc-initiation region 25a into a region 25c at the right of the arc-initiation region. For reasons which will soon be explained, the right hand region 25c of the arrestor has a relatively low impedance. Hence, the passage of the high lightning discharge currents through this path does not generate excessive voltages across the arrestor.

The reason that the right hand portion 25c of the arrestor has a relatively low impedance compared to that of the left hand portion 25b is that the spacing between the insulating sidewalls 45 in this region 25c is relatively large compared to the spacing in the region 25b. This is best illustrated in FIG. 4, which is a cross-sectional view along the line 4—4 of FIG. 3. Referring to FIG. 4, it can be seen that the spacing between the sidewalls 45 increases from a relatively small value in the arc-initiation region to a relatively large value near the end of the electrode 24. This increased spacing of the sidewalls 45 permits any arc burning in this region 25c to increase its cross-section and to become diffused, which in turn permits it to burn with a much lower arc voltage. In effect, this region 25c of relatively large sidewall spacing presents a low impedance path for any lightning discharge current arc which is propelled into it. In a preferred form of our invention, the spacing between the sidewalls 45 increases from a value of about .06 inch in the region 25a to a value of about .20 inch at the end of the inner electrode 24.

For propelling a high current lightning arc in the direction of arrow 37 (FIG. 3) from the arc-initiation region 25a into the low impedance region 25c we disable the lower coil 30 by shorting it out (in a manner soon to be described) and permit the magnetic field 53 from the upper coil 28 to propel the lightning discharge current arc. Since the field 53 has a polarity such as to drive arcs in the direction of arrow 37, the lightning discharge current arc will be driven in the direction of arrow 37. The coil 28 has only a small percentage of the number of turns of the coil 30 and normally its arc-propelling ability is completely defeated by the opposing magnetic field 51 from the coil 30. But when the coil 30 is disabled, the magnetic field 53 is capable of forcing an arc established at the arc-initiation region toward the right. Even though the coil 28 has only a few turns, it can provide a high enough magnetic field 53 to effectively propel the lightning current arc because the lightning current arc that traverses the coil during this interval is very high. It is most desirable that this coil 28 have a minimum number of turns since this limits its impedance to a sufficiently low value to prevent excessive voltages from being developed thereacross by the lightning current.

For disabling the other coil 30 during the period when lightning discharge current is flowing through the arrestor, we provide a coil-shorting gap 70 that is connected in parallel with the coil 30. Since both the magnitude and the rate of change of lightning discharge current are very high and since the coil 30 has a relatively large number of turns, the voltage developed across the coil 30 by the lightning current quickly rises toward a high value. This sharply rising voltage is used to spark-over the coil-shorting gap 70, and thereafter the lightning current flows through the coil shorting gap 70. The coil shorting gap 70 is designed to present a low impedance to the lightning current, and thus the voltages developed thereacross by the lightning current are limited to a relatively low value.

In the illustrated form of our invention, the coil-shorting gap 70 comprises a pair of semicircular electrodes 72 and 74 defining a gap 75 therebetween. Electrode 74 generally surrounds electrode 72, and the centers of curvature of the two electrodes 72 and 74 are offset with respect to each other so that the gap is relatively short in length at one end of the electrodes and gradually increases in length as the other end is approached. The region of reduced electrode spacing 75a is the arc-initiation region. Across this region 75a lightning discharge current arcs are initiated, after which they are driven along the electrodes in the direction of arrow 77 in FIG. 1. Preferably, a low inductance coil 78 connected in series with the main electrodes 72 and 74 of the coil shorting gap 70 is provided for generating the magnetic field for driving the lightning current arc in the direction of arrow 77. This arc motion minimizes electrode vaporization by the high current arc and permits the arc-initiation region 75a to more quickly recover its dielectric strength.

In a preferred form of our invention, we provide the coil shorting gap with triggering means comprising a trigger electrode 82 and an insulating spacer 79 for initiating arcs between the main electrodes 72 and 74. This triggering means is constructed and operates in substantially the same manner as the triggering means 32, 34 of the main gap and therefore will not be explained in detail. The trigger electrode 82 is energized through a capacitor 86 corresponding to the capacitor 36 associated with the trigger of the main gap.

In many applications of our invention, the triggering means 82, 79 and capacitor 86 can be omitted. Usually, the voltage produced across the coil 30 by the rapidly rising lightning discharge current is sufficient to rapidly spark-over the arc-initiation region 75a between electrodes 72 and 74 without assistance from the triggering means.

As will be apparent from FIG. 2, the electrodes 72 and 74 of the coil shorting gap 70 are disposed between plates 80 of insulating material extending generally parallel to the longitudinal axis of any arc established between the electrodes. The spacing between these plates 80 is preferably generally uniform and of about .10 to .15 inch. This relatively large sidewall spacing permits an arc moving in the direction of arrow 77 to increase its cross section and burn with a low arc voltage, as was explained in connection with region 25c of the main gap. In effect, this region of relatively large sidewall spacing presents a low impedance path for the lightning discharge current arcs, and lightning discharge current is therefore able to flow through the arc in the coil-shorting gap 70 without developing an unduly high voltage thereacross.

Typically, the energy of the lightning surge will have been essentially completely dissipated by the time the lightning discharge current arc has moved only part way to the end of the electrodes 72 and 74 in the direction of arrow 77. When the lightning discharge current has fallen to a predetermined value indicative of substantially complete dissipation of the energy of the lightning surge, the arc in the coil-shorting gap 70 will be extinguished. The follow current that flows thereafter follows a path through the coil 30 rather than the gap 70. This is the case because the coil 30 presents a very low impedance to the follow current in view of the low rate of change of the follow current. Since this impedance to follow current through the coil 30 is much lower than that through the coil-shorting gap 70, essentially all of the follow current flows through the coil 30 after passage of the lightning discharge current.

To insure that the impedance to follow current through the coil shorting gap is not too low to permit transfer of the follow current to a path through coil 30, the spacing between sidewalls 80 of the coil shorting gap is somewhat limited, a preferred value being about .10 to .15 inch, as pointed out hereinabove. This is still a considerably larger spacing than the sidewall spacing in regions 25a and 25b of the main gap 25.

As soon as the coil 30 is traversed by follow current, it develops its previously-described magnetic field 51 for driving the arc in the main gap in the direction of arrow 35. The arc in the main gap is then carrying follow current. This arc is forced by the magnetic field 51 into the left hand region 25b of gap 25 where the spacing between the insulating plates is small. This results in the development of a higher arc voltage and higher effective impedance, which drives the current through the arrestor to zero and prevents reestablishment of the arc, all in the same manner as described with respect to switching surge arcs. Typically, the arc carrying power follow current after the passage of lightning discharge current can be extinguished even before it has reached the position 60 of FIG. 3 on its first movement through the arc-running region 25b.

As will be apparent from FIG. 2, the coil-shorting gap 70 is also disposed in the hydrogen-filled envelope 21. Preferably, this gap 70 is located beneath the main gap and is supported on an end cap 90 of the envelope 21 by tubular spacers 91. Screws 92 extend through these spacers 91 and are threaded into the end cap to hold the coil-shorting gap 70 in place. These screws 92 also extend through the supporting plate 48 to clamp this plate 48 in a fixed position at the top of additional spacers 93 resting on the top sidewall 80 of the coil-shorting gap. Still additional tubular spacers 94 are provided about the screws 92 and between the sidewalls 80 to limit the clamping pressure exerted by the screws on the sidewalls.

Although the disclosed surge arrestor can provide effective overvoltage protection against the surge conditions resulting from most types of lightning strokes, this is not to imply that it will be equally effective for all types of lightning strokes. In this respect, a direct stroke immediately at the protected equipment may produce excessive voltage thereacross. But in many application, such as electric railway systems, the system will be suitably shielded from direct lightning strokes in the vicinity of the equipment. The disclosed arrestor is well suited for use in such systems inasmuch as it can easily handle the surge conditions resulting from strokes to the system outside the shielded zone of the system. Sometimes a lightning stroke is to a point located near the system rather than directly to the system. Such strokes frequently induce surge voltages which, if unlimited, could rise to very high values. Our surge arrestor can effectively limit such voltages and protect the equipment against such lightning surge conditions.

In certain applications, it is desirable to provide a capacitor (with a capacitance of about 1 microfarad, for example) across the non-linear resistor 20 of FIG. 1 for the purpose of reducing the voltage developed across the non-linear resistor at the instant of a lightning stroke.

While we have shown and described a particular embodiment of our invention, it will be obvious to those skilled in the art that various changes and modifications may be made without departing from our invention in its broader aspects; and we therefore intend in the appended claims to cover all such changes and modifications as fall within the true spirit and scope of our invention.

What we claim as new and desire to secure by Letters Patent of the United States is:

1. A surge arrestor for a D.C. circuit comprising:
   (a) an envelope containing a gas consisting essentially of hydrogen,
   (b) a pair of spaced-apart main electrodes within said envelope defining a gap therebetween that contains said gas,
   (c) means adapted to electrically connect said main electrodes into said D.C. circuit,
   (d) each of said main electrodes comprising an arc-initiation portion and first and second arc-running portions respectively located at opposite sides of said arc-initiating portion,
   (e) means comprising a trigger electrode located adjacent to the arc-initiation portion of one of said main electrodes for causing an arc to be established between the arc-initiation portions of said main electrodes when said trigger electrode is energized by a voltage surge on said D.C. circuit of a predetermined minimum magnitude,
   (f) first magnetic means for propelling the terminals of an arc off the arc-initiation portions of said main electrodes and along said first arc-running portions of said main electrode in a first direction away from arc-initiation portions,
   (g) said main electrodes being so shaped that the effective length of said gap increases as said arc moves along said first arc-running portions away from said arc-initiation portions, whereby an increasing arc voltage is developed to drive the arc current toward zero,
   (h) second magnetic means for propelling the terminals of an arc off said arc-initiation portions and along said second arc running portions in a direction away from said arc-initiation portions generally opposite to said first direction,
   (i) said first magnetic means having greater arc-propelling ability than said second magnetic means when both of said magnetic means are effective, whereby said first magnetic means when effective predominates over said second magnetic means and propels an arc established at said arc-initiating region along said first arc-running portions,
   (j) disabling means responsive to a lightning surge on said D.C. circuit for disabling said first magnetic means during a lightning surge and thereby causing said second magnetic means to propel an arc established at said arc-initiation portions as a result of said lightning surge along said second arc-running portions,
   (k) said disabling means being effective when the lightning discharge current has fallen to a predetermined value to restore said first magnetic means to its effective condition, whereby said first magnetic means can then propel an arc carrying follow current along said first arc-running portions of said main electrode.

2. The surge arrestor of claim 1 in which the arrestor has a zone of relatively low impedance to arcing current in the region of said second arc-running portions and a zone of substantially higher impedance to arcing current in the region of said first arc-running portions.

3. A surge arrestor for a D.C. circuit comprising:
   (a) an envelope containing a gas consisting essentially of hydrogen,
   (b) a pair of spaced-apart main electrodes within said envelope defining a gap therebetween that contains said gas,
   (c) means adapted to electrically connect said main electrodes into said D.C. circuit,
   (d) each of said main electrodes comprising an arc-initiation portion and first and second arc-running portions respectively located at opposite sides of said arc-initiation portion,
   (e) means comprising a trigger electrode located adjacent to the arc-initiation portion of one of said main electrodes for causing an arc to be established between the arc-initiation portions of said main electrodes when said trigger electrode is energized by a voltage surge on said D.C. circuit of a predetermined minimum magnitude,
   (f) means for propelling an arc established at said arc-initiation portions as a result of a lightning surge along said second arc-running portions during the passage of lightning discharge current,
   (g) and means for propelling arcs carrying power follow current after passage of said lightning discharge current along said first arc-running portions,
   (h) said main electrodes being so shaped that the effective length of said gap increases as said arc moves along said first arc-running portions away from said arc-initiation portions, whereby an increasing arc voltage is developed to drive the arc current toward zero.

4. The surge arrestor of claim 3 in which the arrestor presents a relatively low impedance to current flowing through arcs on said second arc-running portions and a substantially higher impedance to current-flowing through arcs on said first arc-running portions.

5. A surge arrestor for a D.C. circuit comprising:
   (a) a pair of spaced-apart electrodes defining a gap therebetween,
   (b) means adapted to electrically connect said electrodes into said D.C. circuit,
   (c) each of said electrodes comprising an arc-initiation portion and first and second arc-running portions respectively located at opposite sides of said arc-initiation portion,
   (d) means for causing an arc to be established between said arc-initiation portions in response to a voltage surge of a predetermined minimum magnitude appearing on said D.C. circuit,
   (e) means for propelling an arc established between said arc-initiation portions as a result of a lightning surge along said second arc-running portions during the passage of lightning discharge current,
   (f) means for propelling an arc carrying power follow current after passage of said lightning discharge current along said first arc-running portions in a direction away from said arc-initiation portions,
   (g) and means for developing as said power follow current arc moves along said first arc-running portions an increasing arc voltage that forces the power follow current toward zero.

6. The surge arrestor of claim 5 in which:
   (a) means is provided for presenting a relatively low impedance to current flowing through arcs on said second arc-running portions, and
   (b) means is provided for presenting a substantially higher impedance to current flowing through arcs on said first arc-running positions.

7. In the interrupter of claim 5, a pair of sidewalls of insulating material disposed at opposite sides of said electrodes and extending across said gap at the sides thereof, the effective spacing of said sidewalls at the sides of said gap being substantially greater in the region of said second arc-running portions than in the region of said first arc-running portions.

8. A surge arrestor for a D.C. circuit comprising:
   (a) a pair of spaced-apart main electrodes defining a gap therebetween, (b) means adapted to electrically connect said main electrodes into said D.C. circuit,
(c) each of said main electrodes extending about a fractional portion of the periphery of a curve approximating a circle, with one electrode being disposed about the outer periphery of the other, the fractional portion of said periphery being greater than half,
(d) each of said electrodes having an arc-initiation portion intermediate its ends and first and second arc-running portions on the respective opposite sides of said arc-initiation portion,
(e) one of said electrodes having a radius of curvature substantially smaller than the other and a center of curvature which is offset from the center of curvature of the other in such a manner that the arc-initiation portions of said electrodes are relatively close together and the arc-running portions are at progressively greater distances apart proceeding in a direction away from said arc-initiation portions,
(f) means comprising a trigger electrode located at the arc-initiation portion of one of said main electrodes for causing an arc to be established between said arc-initiation portion when said trigger electrode is energized by a voltage surge of a predetermined magnitude appearing on said D.C. circuit,
(g) magnetic means for propelling an arc established between said arc-initiation portions as a result of a lightning surge along said second arc-running portions during the passage of lightning discharge current,
(h) means responsive to a fall in said lightning discharge current to a predetermined value for propelling an arc carrying power follow current after passage of said lightning discharge current along said first arc-running portions in a direction away from said arc-initiation portions,
(i) and means for developing, as said power follow arc moves along said first arc-running portions, an increasing arc voltage that forces the power follow current toward zero.

9. The surge arrestor of claim 8 in which said means for propelling power follow current arcs along said first arc-running portions is also effective to propel arcs resulting from switching surges along said first arc-running portions.

10. In the surge arrestor of claim 8, a pair of sidewalls of insulating material disposed at opposite sides of said main electrodes and extending across said gap at the sides thereof generally parallel to the longitudinal axis of an arc between said main electrodes, the effective spacing of said sidewalls at the sides of said gap being substantially greater in the region of said second arc-running portions than in the region of said first arc-running portions.

References Cited by the Applicant
UNITED STATES PATENTS

| | | |
|---|---|---|
| 2,415,816 | 2/1947 | Depew et al. |
| 2,456,855 | 12/1948 | Arnott et al. |
| 2,456,986 | 12/1948 | Paluev. |
| 2,614,232 | 10/1952 | Kalb. |
| 2,825,008 | 2/1958 | Kalb. |

JAMES W. LAWRENCE, *Primary Examiner.*

P. C. DEMEO, *Assistant Examiner.*